(12) United States Patent
Horn et al.

(10) Patent No.: US 9,445,443 B2
(45) Date of Patent: Sep. 13, 2016

(54) NETWORK BASED PROVISIONING OF UE CREDENTIALS FOR NON-OPERATOR WIRELESS DEPLOYMENTS

(71) Applicant: QUALCOMM Incorporated, San Diego, CA (US)

(72) Inventors: Gavin Bernard Horn, La Jolla, CA (US); Anand Palanigounder, San Diego, CA (US); Olivier Jean Benoit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 14/489,234

(22) Filed: Sep. 17, 2014

(65) Prior Publication Data
US 2015/0092701 A1 Apr. 2, 2015

Related U.S. Application Data

(60) Provisional application No. 61/883,844, filed on Sep. 27, 2013.

(51) Int. Cl.
| | |
|---|---|
| *H04J 3/08* | (2006.01) |
| *H04W 76/02* | (2009.01) |
| *H04W 4/00* | (2009.01) |
| *H04W 84/12* | (2009.01) |
| *H04W 12/04* | (2009.01) |
| *H04W 8/18* | (2009.01) |

(52) U.S. Cl.
CPC ........... *H04W 76/021* (2013.01); *H04W 4/001* (2013.01); *H04W 12/04* (2013.01); *H04W 84/12* (2013.01); *H04W 8/18* (2013.01)

(58) Field of Classification Search
CPC . H04W 76/021; H04W 4/001; H04W 84/12; H04W 12/04; H04W 8/18; H04W 7/0215
See application file for complete search history.

(56) References Cited

U.S. PATENT DOCUMENTS

| | | | |
|---|---|---|---|
| 8,295,811 B1 * | 10/2012 | Gailloux ........... | H04M 3/42144 455/411 |
| 2012/0282891 A1 * | 11/2012 | Mohammed ........ | H04L 63/0428 455/406 |
| 2015/0092701 A1 * | 4/2015 | Horn ..................... | H04W 4/001 370/329 |

OTHER PUBLICATIONS

ISA/EPO, International Search Report and Written Opinion of the International Searching Authority, Int'l App. No. PCT/US2014/056245, Dec. 4, 2014, European Patent Office, Rijswijk, NL 11 pgs.

* cited by examiner

*Primary Examiner* — Robert Wilson
(74) *Attorney, Agent, or Firm* — Holland & Hart LLP

(57) ABSTRACT

Methods, systems, and devices are described for provisioning of devices, such as UEs, for service at a wireless network. One or more device parameters may be identified for use in provisioning the device on the wireless network, which may be provided to a network element. The network element may use the provided parameters to access a subscription server. The subscription server may provide verification and/or subscription parameters of the device that may then be used by the device to verify that the device is authorized to access the wireless network.

28 Claims, 13 Drawing Sheets

NETWORK BASED PROVISIONING OF UE CREDENTIALS FOR NON-OPERATOR WIRELESS DEPLOYMENTS

CROSS REFERENCES

The present application for patent claims priority to U.S. Provisional Patent Application No. 61/883,844 by Horn et al., entitled "Network Based Provisioning of UE Credentials for Non-Operator Wireless Deployments," filed Sep. 27, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

Operators of cellular networks, referred to herein as operators, may have exclusive rights to some portion of the licensed spectrum, and may deploy a number of base stations and other network elements to provide access to the operator network through the licensed spectrum. A UE associated with the operator may gain access to the operator's network through security credentials that are associated with the UE. For example, a UE may include a Subscriber Identity Module (SIM) card that may include an International Mobile Subscriber Identity (IMSI) and one or more key for use in identification and authentication of subscribers of the operator. UEs that are associated with an operator may not be authenticated as subscribers on another operator's network, and may access the other operator's network through roaming procedures, for example.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WLANs may operate in an unlicensed spectrum. In some deployments, WLANs may be configured to operate according to protocols of a cellular network. Because such WLANs may operate in an unlicensed spectrum, this provides the possibility that network access may be provided through such WLANs by non-operators. That is, a company that does not have any rights to licensed spectrum, or does not have rights to licensed spectrum in a particular geographic area, may provide access to UEs through unlicensed spectrum.

SUMMARY

The described features generally relate to one or more improved systems, methods, and/or devices for wireless communications, and more particularly, to provisioning of devices, such as UEs, for service at a wireless network. According to some embodiments, one or more device parameters may be identified for use in provisioning the device on the wireless network, which may be provided to a network element. The network element may use the provided parameters to access a subscription server which may provide verification and/or subscription parameters of the device.

In a first set of illustrative examples, a method for provisioning a device for service at a wireless network is provided. The method may include identifying a set of device parameters to be used by a server to provision the device for service on the wireless network, transmitting at least a subset of the set of device parameters to a network element, and receiving one or more of a verification parameter or subscription parameter generated by the server for the device to access the wireless network in response to the transmission of the device parameters.

In some examples, the set of device parameters may include an international mobile equipment identity (IMEI), a mobile equipment identifier (MEID), a medium access control (MAC) address, Network Access Identifier (NAI) and/or an international mobile subscriber identity (IMSI). The set of device parameters may include, in some examples, an identifier for the device or a server identifier and/or a shared secret with the server identified by the server identifier. The server identifier may include, for example, a uniform resource locator (URL), a fully qualified domain name (FQDN), and/or an Internet protocol (IP) address for a server associated with the device.

In some examples, the transmitting may include transmitting the device parameters to the network element via a non-access stratum (NAS) message, which may include an uplink (UL) generic NAS transport message. In some examples, the identifying may include determining that the device is within a coverage area of a network based on a deployment identifier of the network, and identifying the set of device parameters responsive to the determining. In some examples, the network may be a non-provisioned network. Additionally or alternatively, the identifying may include receiving a user input to connect to a network and identifying the set of device parameters responsive to the receiving.

The subscription parameter and/or verification parameter may include, for example, a globally unique temporary identity (GUTI), international mobile subscriber identity (IMSI), and/or token derived using a shared secret or a public key associated with the device. The token may be signed, for example, based on a deployment identifier of the non-provisioned network and the GUTI and/or IMSI assigned to the device, using a shared secret or a private key of a subscription server associated with the device. In some examples, receiving the subscription parameter may include deriving a permanent security key associated with the subscription parameter, and storing the permanent security key and subscription parameter as subscription credentials for the wireless network.

In a second illustrated example, an apparatus for wireless communications is provided. The apparatus may include a processor and memory in electronic communication with the processor. The memory may include instructions executable by the processor to cause the apparatus to identify a set of device parameters to be used by a server to provision the device for service on the wireless network, transmit at least a subset of the set of device parameters to a network element, and receive one or more of a verification parameter or subscription parameter generated by the server for the device to access the wireless network in response to the transmission of the device parameters. In certain examples, the apparatus may implement one or more aspects of the method for wireless communications described above with respect to the first set of illustrative examples.

In a third set of illustrative example, a method for provisioning a device for service at a wireless network is provided. The method may include receiving a request to provision the device on the wireless network including a set of device parameters to be used by a server to provision the device for service on the wireless network, establishing a connection to the server associated with the device responsive to receiving the request, receiving a set of subscription parameters for the device, and transmitting one or more of the received subscription parameters to the device.

In some examples, establishing the connection may include providing a deployment identifier associated with the wireless network. The set of device parameters may include an identifier for the device or a server identifier for a server to provision security credentials of the device. In some examples, receiving the request to provision may include receiving the set of device parameters via a non-access stratum (NAS) message, which may include an uplink (UL) generic NAS transport message. In some examples, the set of device parameters may include one or more of an international mobile equipment identity (IMEI), a mobile equipment identifier (MEID), a medium access control (MAC) address, Network Access Identifier (NAI) or an international mobile subscriber identity (IMSI). The set of device parameters may also include, in some examples, a shared secret. The subscription parameters may include, for example, a globally unique temporary identity (GUTI), international mobile subscriber identity (IMSI), and/or token derived using a public key, associated with the device.

In fourth set of illustrative example, an apparatus for wireless communications is provided, which may include a processor, a memory in electronic communication with the processor, and instructions stored in the memory. The instructions may be executable by the processor to cause the apparatus to receive a request to provision the device on the wireless network including a set of device parameters to be used by a server to provision the device for service on the wireless network, establish a connection to the server associated with the device responsive to receiving the request, receive a set of subscription parameters for the device, and transmit one or more of the received subscription parameters to the device. In certain examples, the apparatus may implement one or more aspects of the method for wireless communications described above with respect to the third set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
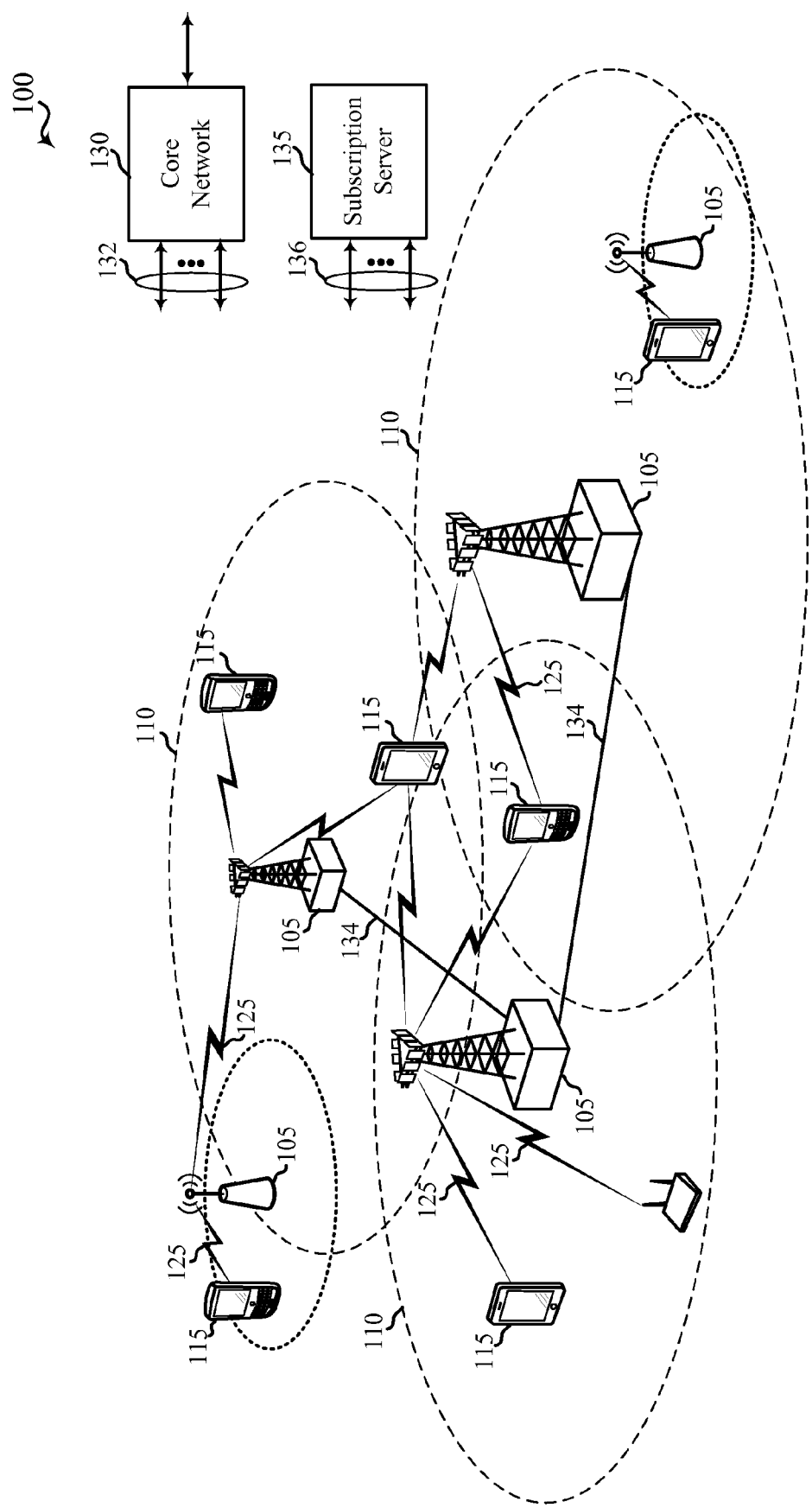
FIG. 1 shows a diagram of a wireless communications system according to various embodiments.

Methods, apparatuses, systems, and devices are described in which an unlicensed spectrum (e.g., a spectrum typically used for WiFi communications) may be used for cellular communications (e.g., Long Term Evolution (LTE) communications).

With the increase in traffic because of offloading from cellular networks, access to unlicensed spectrum may provide operators with opportunities for enhanced data transmission capacity. Furthermore, as mentioned above, non-operators may in some cases provide network access using unlicensed spectrum. In such cases, a user may purchase a UE that is not provisioned for access with a particular operator. For example, a non-operator company may provide a LTE-capable UE that is configured for LTE access through LTE/LTE-A communication using an unlicensed, shared and/or licensed spectrum. Such a non-operator also provide an LTE/LTE-A access point that an individual or entity may purchase that may provide LTE/LTE-A access through unlicensed or shared spectrum. Recognizing that the non-operator UE may be entitled to network access through such an LTE/LTE-A access point, however, may require techniques that are different than techniques used by operators for verifying UE access credentials to the operator's network.

In operator-based networks, an access point, such as an eNB, may communicate with a home subscriber server (HSS) maintained by the operator that may be used to verify credentials of a UE seeking to access the operator's network such as through, for example, an IMSI that is stored on a SIM card within the UE. Thus, a UE that is associated with an operator may seek access to the operator network through an LTE attach procedure in which UE credentials may be verified through the HSS.

However, cases where a non-operator may provide a UE and LTE/LTE-A access point, the access point, such as an LTE/LTE-A eNB, may not have access to an equivalent to a HSS, and in some cases may not have information to enable verification of credentials of non-operator UEs. Prior to gaining channel access and communicating using an unlicensed spectrum, a transmitting device, such as the UE, may need to be authenticated with the network or access point, however. In instances where the device has not accessed the network through the access point previously, the device may not be able to provide necessary security credentials to access the network through the access point. According to some embodiments, various techniques for provisioning UEs are provided that may be used in examples such as described above to gain network access.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. Some of the access points 105, according to some embodiments, may not be associated with a particular operator, and may communicate device parameters, verification parameters, and subscription parameters for a UE 115 with a subscription server 135 through network connections 136. In some embodiments, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the system 100 may include an LTE/LTE-A communications system (or network) that supports one or more LTE modes of operation or deployment scenarios. In other embodiments, the system 100 may support wireless communications using an unlicensed spectrum or a licensed spectrum and an access technology different from LTE/LTE-A. In LTE/LTE-A communications systems, the term evolved NodeB or eNB may be generally used to describe of the access points 105. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A communications in an unlicensed or shared spectrum may be supported in which LTE downlink and/or uplink capacity in a licensed spectrum may be offloaded to an unlicensed spectrum. In many deployments, as mentioned above, a device seeking to transmit using unlicensed spectrum may be required to verify the devices security credentials needed to authorize access of the device to the network through an access point. Furthermore, in some cases the access point may not be associated with any particular operator and may not be in communication with a HSS, for example, that may be used to verify a device's credentials. In such cases, the device needs to be provisioned with credentials to allow access through the particular access point.

Figure 2:
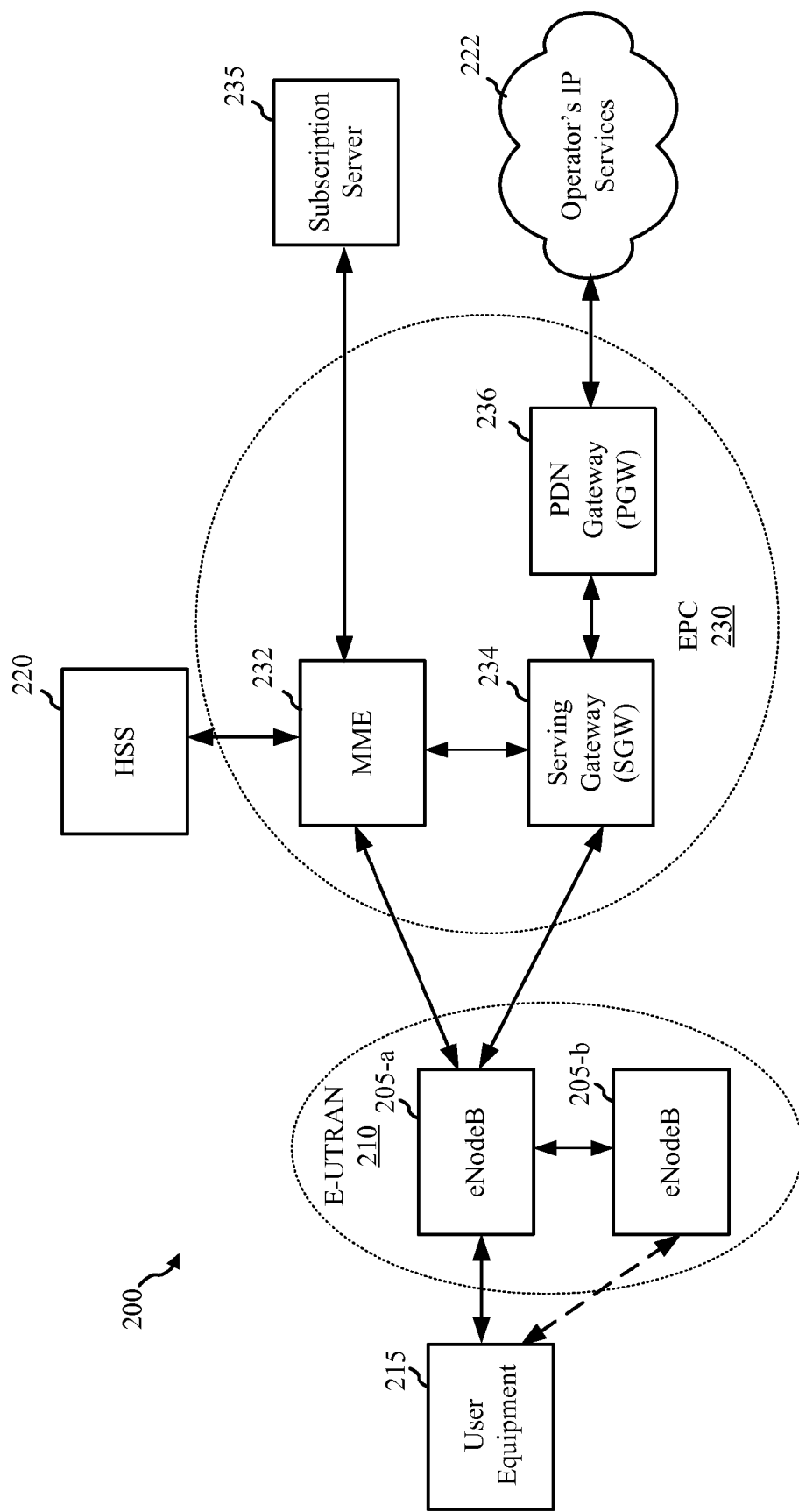
FIG. 2 shows a diagram illustrating an LTE/LTE-A network architecture that may provision a non-operator UE in accordance with various embodiments.

FIG. 2 is a diagram illustrating an LTE/LTE-A network architecture in a wireless communications system 200 in accordance with various embodiments. The LTE/LTE-A network architecture of the wireless communications system 200 may include one or more UEs 215, an Evolved UMTS Terrestrial Radio Access Network (E-UTRAN) 210, an Evolved Packet Core (EPC) 230, a Home Subscriber Server (HSS) 220, and an Operator's IP Services 222. The wireless communications system 200 may interconnect with other access networks, but for simplicity those entities/interfaces are not shown. As shown, the wireless communications system 200 provides packet-switched services, however, as those skilled in the art will readily appreciate, the various concepts presented throughout this disclosure may be extended to networks providing circuit-switched services.

The E-UTRAN 210 may include an eNB 205-a and other eNBs 205-b. The eNB 205-a may provide user and control plane protocol terminations toward the UE 215. The eNB 205-a may be connected to the other eNBs 205-b via an X2 interface (e.g., backhaul). The eNB 205-a may provide an access point to the EPC 230 for the UE 215. The eNB 205-a may be connected by an S1 interface to the EPC 230. The EPC 230 may include one or more Mobility Management Entities (MMES) 232, one or more Serving Gateways 234, and one or more Packet Data Network (PDN) Gateways 236. The MME 232 may be the control node that processes the signaling between the UE 215 and the EPC 230. Generally, the MME 232 may provide bearer and connection management, and may verify UE 215 credentials with HSS 220. Furthermore, according to some embodiments as will be described in more detail below, the MME 232 may determine that the UE 215 is not provisioned for the wireless communications system 200, and may perform network-based provisioning for the UE 215. Network-based provisioning may include transmitting a request to a subscription server 235 to obtain one or more verification parameters and/or subscription parameters that may be used to authenticate the UE 215 with the wireless communications system 200. All user IP packets may be transferred through the Serving Gateway 234, which itself may be connected to the PDN Gateway 236. The PDN Gateway 236 may provide UE IP address allocation as well as other functions. The PDN Gateway 236 may be connected to the Operator's IP Services 222. The Operator's IP Services 222 may include the Internet, the Intranet, an IP Multimedia Subsystem (IMS), and a Packet-Switched (PS) Streaming Service (PSS).

The UE 215 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

Figure 3:
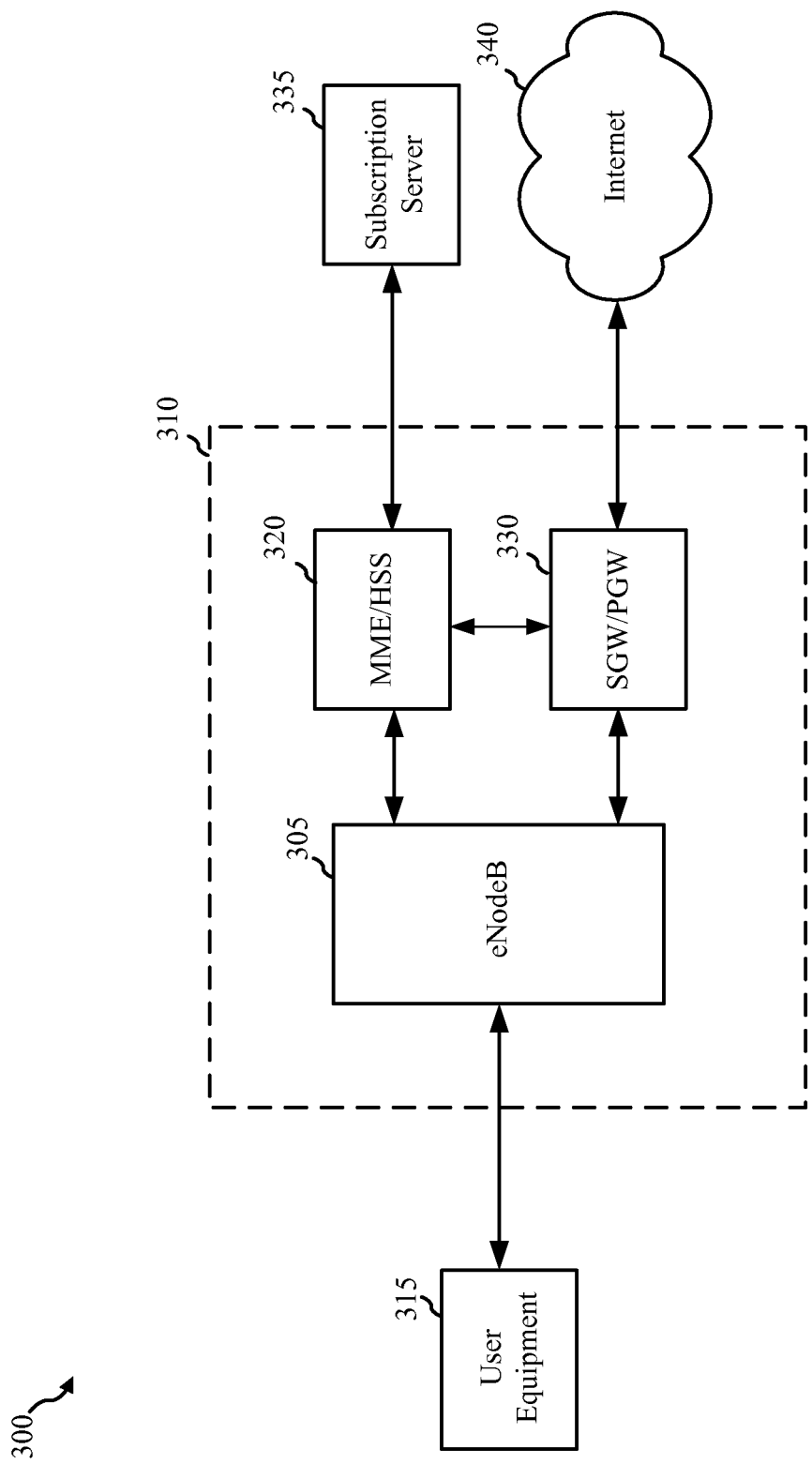
FIG. 3 shows a diagram illustrating a non-operator network architecture that may provision a non-operator UE in accordance with various embodiments.

Turning next to FIG. 3, a wireless communications system 300 illustrates an example of a standalone LTE architecture in accordance with various embodiments. Such a standalone system 300 may be, for example, a residential network architecture for standalone LTE deployment. Such a system 300 may be included as part of, or may be in communication with one or more network components of wireless communications systems 100 and/or 200 as discussed with respect to FIG. 1 and FIG. 2, for example. The system 300 may include one or more UEs 315, and an access system 310. The access system 310 may include an eNB 305, a SGW/PGW component 330, and a MME/HSS component 320. The MME/HSS component 320 may be configured to communicate with subscription server 335, and SGW/PGW component 330 may be configured to provide wide area network access, such as access to the Internet 340. In some embodiments, the MME/HSS 320 may communicate with subscription server 335 through SGW/PGW 330 and Internet 340.

The access system 310 may include eNB 305, which may provide user and control plane protocol terminations toward the UE 315, similarly as with other eNBs 105 and 205 as discussed above. The eNB 305 may provide an access point to the MME/HSS 320 and the SGW/PGW 330. The MME/HSS 320 may be the control node that provides bearer and connection management, and may verify UE 315 credentials. In the event that MME/HSS 320 determines that UE 315 is not provisioned for the access system 310, it may transmit a request to a subscription server 335 to obtain one or more verification parameters and/or subscription parameters that may be used to authenticate the UE 315 with the system 310. Obtaining parameters to provision UE 315 with system 310 will be described in more detail below for various embodiments, with respect to FIGS. 8-12. All user IP packets may be transferred through the SGW/PGW 330, which may provide UE 315 IP address allocation as well as other functions.

Figure 4:
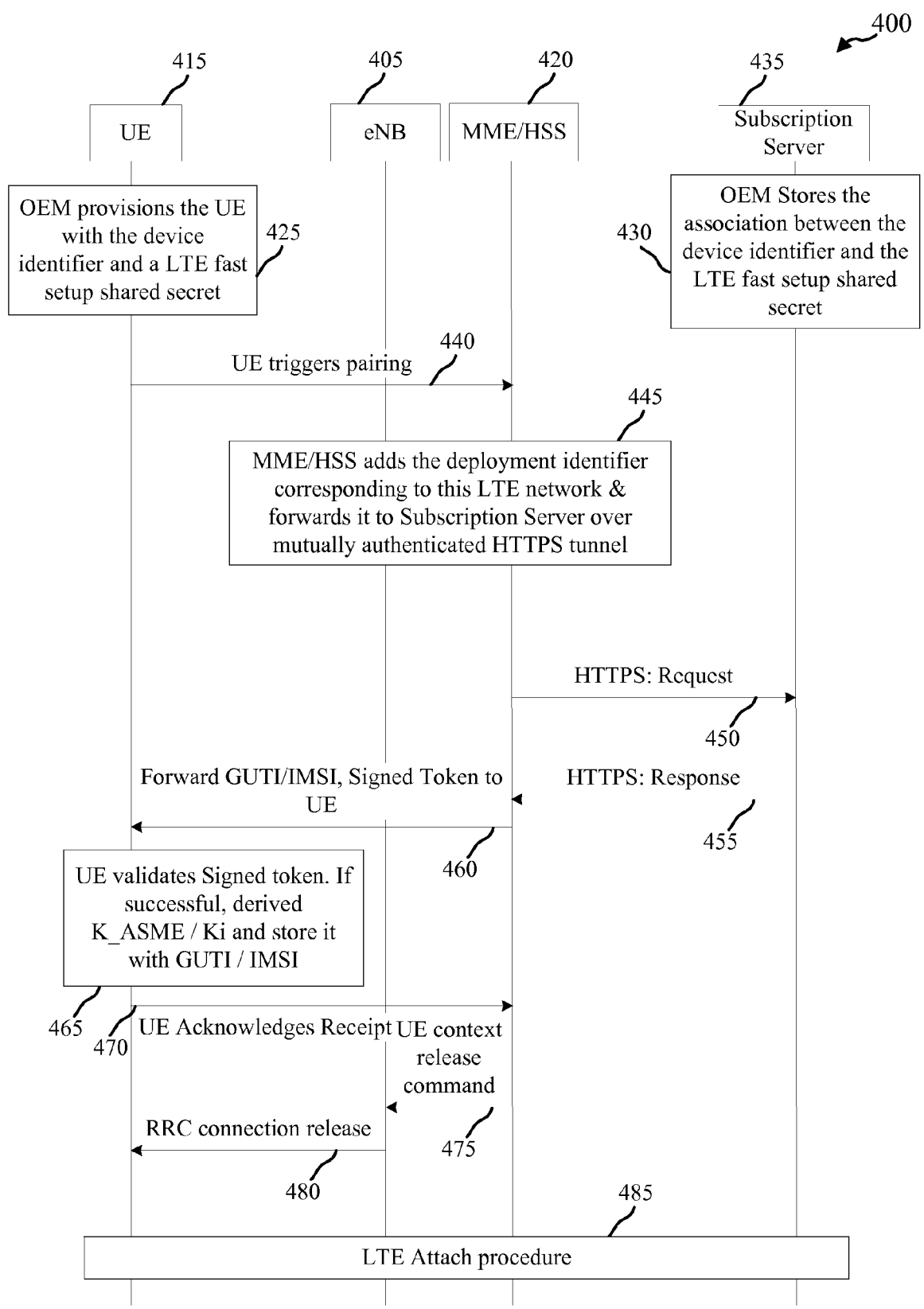
FIG. 4 shows a message flow diagram for provisioning a UE according to various embodiments.

Turning now to FIG. 4, a message flow diagram 400 is described for provisioning a UE 415 with an eNB 405 and MME/HSS 420 according to various embodiments. Message flow diagram 400 may illustrate, for example, provisioning operation for a UE 115 of FIG. 1, a UE 215 of FIG. 2, and/or a UE 315 of FIG. 3 that may be provisioned for network access via an access point. Such an access point may include eNB 405 and/or MME/HSS 420, through which the UE 415 may desire to communicate.

At block 425, UE 415 may be provisioned with LTE fast-setup specific credentials. For example, UE 415 may be provisioned by the OEM during the device manufacturing time with a device identifier and an associated shared secret. Furthermore, the UE 415 may be provided with a URL that may be used to locate subscription server 435. This information is also stored in subscription server 435, as indicated at block 430. Such a subscription server 435 may be an example of subscription servers 135, 235, and/or 335 as discussed above with respect to FIGS. 1, 2, and 3, respectively. Subscription server 435 may be, for example, a server that is maintained by the OEM. The OEM, similarly as discussed above, may be a non-operator OEM and the UE 415 may not include a SIM card/IMSI, or other unique operator identifier, that is associated with a particular operator network.

As indicated at 440, LTE pairing may be triggered at the UE 415. Pairing may be based, for example, on either coming under the coverage of a new LTE network based on a known Mobile Country Code (MCC) and/or Mobile Network Code (MNC), or user trigger such as manual Public Land Mobile Network (PLMN) selection or manual Closed Subscriber Group (CSG) selection, for example. The UE 415, as part of the pairing message 440 may send the device identifier and subscription server URL to the MME/HSS 420. This can be done either out-of-band or in-band using LTE. In some embodiments, LTE signaling/transport may be defined using, for example, non-access stratum (NAS) or radio resource control (RRC) signaling as a container. In some examples, the UE 415 and MME/HSS 420 may use downlink/uplink generic NAS transport messages with a generic message container type indicating LTE fast setup messages. In some examples, the NAS messages may not be integrity protected. In further examples, in which the pairing message may be transmitted in-band, the eNB 405 may advertise support for the LTE fast setup such as in a System Information Block (SIB), for example.

At block 445, the MME/HSS 420 receives a URL (or equivalent) for the subscription server 435 and a device identifier, such as IMEI for the UE 415. In some examples, different device identifiers may be used, such as Mobile Equipment Identifier (MEID), or Medium Access Control (MAC) address (EUI 64 or EUI 48), for example. In some examples, MME/HSS 420 includes collocated MME and HSS functions. However, in some other examples, the MME and HSS may not be collocated, and a Diameter procedure may be used between the MME and HSS to provide the LTE fast-setup credentials to the HSS and to return verification and/or subscription parameters (such as GUTI (or IMSI) and token, for example) to the MME.

With continuing reference to FIG. 4, at 450 the MME/HSS 420 sends an HTTPS request to the subscription server 435 identified by the URL (or equivalent) including a standalone LTE deployment identifier and the UE device identifier. Such a standalone LTE deployment identifier may include, for example, a MCC and/or MNC, or other similar identifier. The subscription server 435 and the MME/HSS 420 establish a mutually authenticated HTTPS tunnel. The subscription server 435 may authenticate that the deployment identifier claimed by the MME/HSS 420 is valid. Similarly, the MME/HSS 420 may authenticate the subscription server 435. This authentication may be based on client (identifying the deployment id of MME/HSS 420) and server (identifying the subscription server 435) certificates. The authentication of the deployment ID, according to some examples, may ensure that the eNB 405 has the correct ID when it derives a key for a security credential.

The subscription server 435 assigns UE 415 a Globally Unique Temporary UE Identity (GUTI) (or an International Mobile Subscriber Identity (IMSI)) and derives a UE 415 specific security root key $K_{ASME}$ (or Ki in the case an IMSI is assigned to UE 415) and sends it to the MME/HSS 420. This GUTI/IMSI and respective $K_{ASME}$/Ki pair becomes the UE 415 subscription credentials for the specific network of eNB 405 and MME/HSS 420. The $K_{ASME}$ Ki derivation includes the deployment identifier associated with the MME/HSS 420, according to some examples. The subscription server 435 sends this information to the MME/HSS 420 at 455. In addition, the subscription server 435 may sign the deployment identifier and the GUTI/IMSI assigned to HSS/MME 420 using the private key of the subscription server 435 certificate and sends it as a token to the HSS/MME 420.

The HSS/MME 420 may send this token to the UE 415, as indicated at 460. The UE 415, at block 465, may then verify the token using the subscription server 435 certificate (public key) and if the verification is successful, the UE 415 derives the $K_{ASME}$/Ki (using same method as the subscription server) and stores the GUTI/$K_{ASME}$ or IMSI/Ki as the subscription credentials for this particular eNB 405 and MME/HSS 420 network (e.g., MCC/MNC or similar identifier).

The GUTI/$K_{ASME}$ (or IMSI/Ki) pairs associated with the network may be used for LTE authentication, with the remaining LTE attach procedures remaining the same, according to embodiments. Determining UE 415 context and security keys based on the standalone LTE identifier (LTE deployment identifier) are now described for various examples. Candidates for the standalone LTE identifier may include PLMN ID, Tracking area code, eNB identifier, CSG id, or some combination thereof. The device id ($UE_{device-id}$) can be any identity that uniquely identifies the UE 415 to the subscription server 435.

Both the UE 415 and the subscription server 435 share a secret key, $K_{device-root}$. The $K_{ASME}$ (or Ki) that is associated with the GUTI (or IMSI) assigned to the standalone LTE network is derived as follows both at the UE 415 and the MME/HSS 420:

$K_{ASME}$ (or Ki)=least or most significant 128/256 bits
 of KDF ($K_{device-root}$, INPUT).

Where: KDF is any key derivation function (e.g., SHA256). The output of the KDF is truncated to either 128-bits or 256-bits depending on whether the network uses 128-bit keys or 256-bit keys. $K_{device-root}$ is the key that is shared between the UE 415 and the subscription server 435. INPUT is some arbitrary data that is unique to the given UE 415 and the LTE deployment network (e.g., the INPUT-DATA may include information such as UE 415 device identifier, LTE deployment identifier that is either known to both the UE 415 and the subscription server 435 or delivered to them before the key derivation, such as through in-band signaling or out-of-band signaling, and may include nonces generated and exchanged between (or known to) the UE 415 and the subscription server 435.

Following UE 415 validation at block 465, for an in-band connection, the MME/HSS 420 releases the connection by sending a UE context release command 475 to the eNB 405. Note that the trigger for this may be an acknowledgement message 470 sent by the UE 415 in an uplink generic NAS transport for the LTE fast setup, for example. The eNB releases the RRC connection at 480. Once the LTE fast setup is complete, the UE 415 may perform a new attach procedure 485 defined for a UE 415 according to established LTE standards.

According to some embodiments, the UE 415 and eNB 405 may exchange uplink and downlink messages using generic NAS transport messages. Such generic NAS transport messages may be exchanges using the Generic message container defined in the LTE standards, such as, for example, section 9.9.3.43 of TS 24.301. Table 1 indicates exemplary generic NAS transport messages:

TABLE 1

UE provisioning messages (as part
of UL/DL Generic NAS transport

| | |
|---|---|
| UE provided credentials | Credentials provided by UE for provisioning at MME/HSS (IEs include device ID, subscription server URL) |
| Network provided credentials | Network identifier and token used by the UE to determine the K_ASME or KI (IEs include GUTI/IMSI, signed token for subscription server) |

Figure 5:
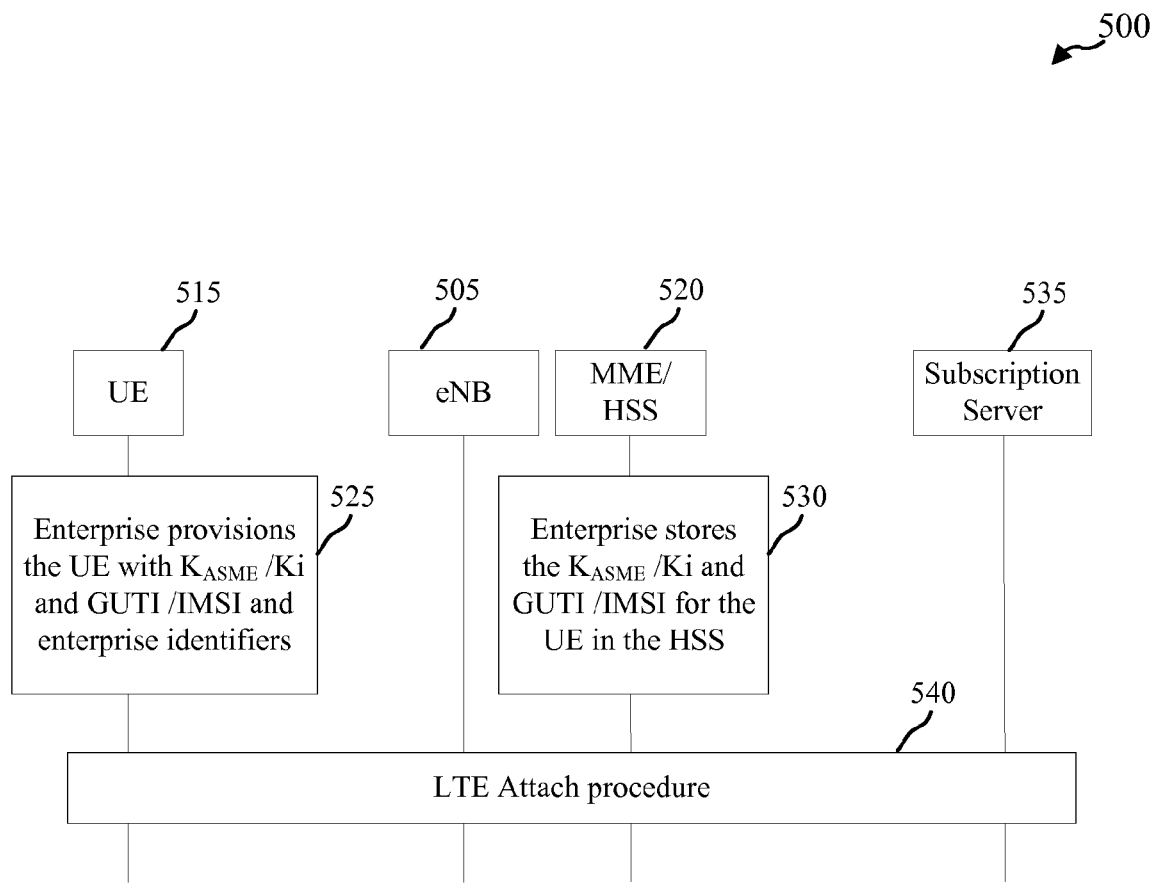
FIG. 5 shows another message flow diagram for provisioning a UE according to various embodiments.

Turning now to FIG. 5, a message flow diagram 500 is described for provisioning a UE 515 with an eNB 505 and MME/HSS 520 according to various embodiments. Message flow diagram 500 may illustrate, for example, provisioning operation for a UE 115 of FIG. 1, a UE 215 of FIG. 2, and/or a UE 315 of FIG. 3 that may be provisioned for network access via an access point. The access point may include eNB 505 and/or MME/HSS 520, through which the UE 515 may desire to communicate.

At block 525, UE 515 may be provisioned with a GUTI/$K_{ASME}$ or IMSI/Ki pair associated with the identity of the enterprise network such as (PLMN, CSG) pair, and/or a PLMN and a list of cell IDs and TAIs. At block 530, the enterprise may store the $K_{ASME}$/Ki and GUTI/IMSI for the UE 515 in the MME/HSS 520. In some deployments, the identity of the enterprise network may not be unique and so there may be another eNB advertising the same identifiers somewhere else that may be advertised by eNB 505. However, the UE 515 credentials for this enterprise network will not work at the other eNB at a different enterprise network, as the other eNB will not have the credentials, and so the UE 515 will not be able to successfully access the other eNB and, in some embodiments, may blacklist it as forbidden based on the location or some other identifier. For example, the enterprise could also define a HNB Name as a text based identifier to help the user/UE to identify the enterprise in the event confusion exists.

Determining the device identifier of a UE 515 and URL (or equivalent) for the subscription server at block 525 may be accomplished in a number of manners. In some embodiments, determining the device identifier and URL by the enterprise network may include manual entry via a keyboard, scanning such as from a QR code, and/or through transmission to the UE 515 using near field communications (NFC). In some embodiments, the IP address of subscription server may be determined through a domain name search (DNS) based on the URL, DHCP, OAM, device identifier of the UE and/or manual configuration, to name but a few examples. In some examples, a UE 515 may use IMEI instead of IMSI for identifying the UE, which may be more efficient for OEMs to maintain. Similarly NAI may be used in some examples. Additionally, according to some embodiments, the various described methods may be accomplished directly at the MME/HSS 520 or via a managing device such as a smart phone, laptop, etc.

Figure 6A:
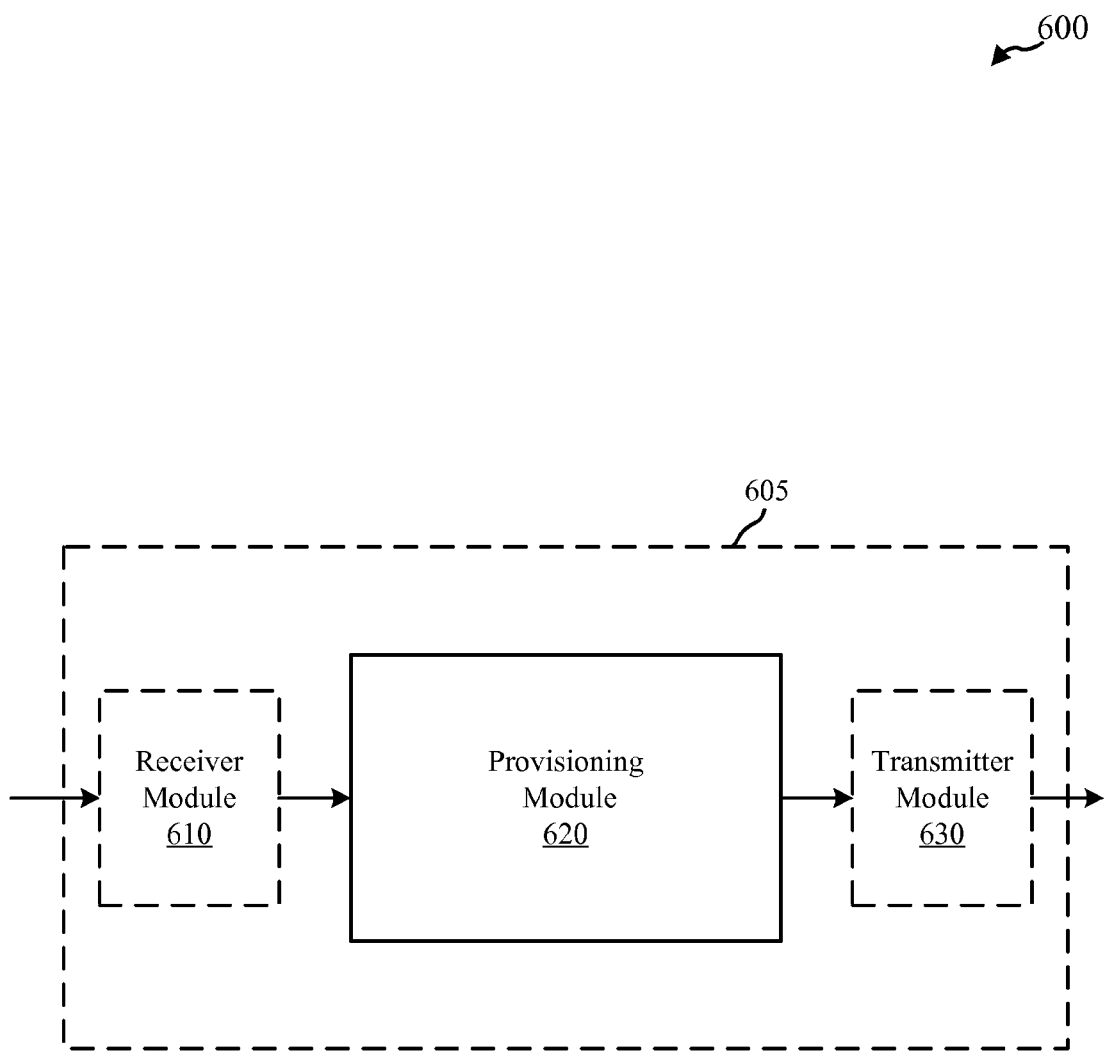
FIGS. 6A and 6B show block diagrams of examples of devices, such as eNBs, UEs, or other network elements for use in wireless communications according to various embodiments.

Referring now to FIG. 6A, a block diagram 600 illustrates a device 605 for use in wireless communications in accordance with various embodiments. In some embodiments, the device 605 may be an example of one or more aspects of the eNBs 105, 205, 305, 405, 505, UEs 115, 215, 315, 415, 515, and/or MME/HSS 220 and 232, 320, 420, or 520 described with reference to FIGS. 1, 2, 3, 4, and/or 5. The device 605 may also be a processor. The device 605 may include a receiver module 610, an provisioning module 620, and/or a transmitter module 630. Each of these components may be in communication with each other.

The components of the device 605 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 610 may be or include a radio frequency (RF) receiver, such as an RF receiver operable to receive transmissions in a licensed spectrum and/or an unlicensed spectrum. The receiver module 610 may be used to receive various types of data and/or control signals (i.e., transmissions) over one or more communication links of a wireless communications system including the licensed and unlicensed spectrums, such as one or more communication links of the wireless communications system 100, 200, and/or 300 described with reference to FIG. 1, 2, and/or 3.

In some embodiments, the transmitter module 630 may be or include an RF transmitter, such as an RF transmitter operable to transmit in the licensed spectrum and/or the unlicensed spectrum. The transmitter module 630 may be used to transmit various types of data and/or control signals (i.e., transmissions) over one or more communication links of a wireless communications system, such as one or more communication links of the wireless communications system 100, 200, and/or 300 described with reference to FIG. 1, 2, and/or 3. In some embodiments, the provisioning module 620 may configure and/or perform provisioning operations to provision a UE for communication with a wireless network. Provisioning performed by provisioning module 620 may include some or all of the provisioning operations discussed above with respect to FIGS. 4 and 5.

Figure 6B:
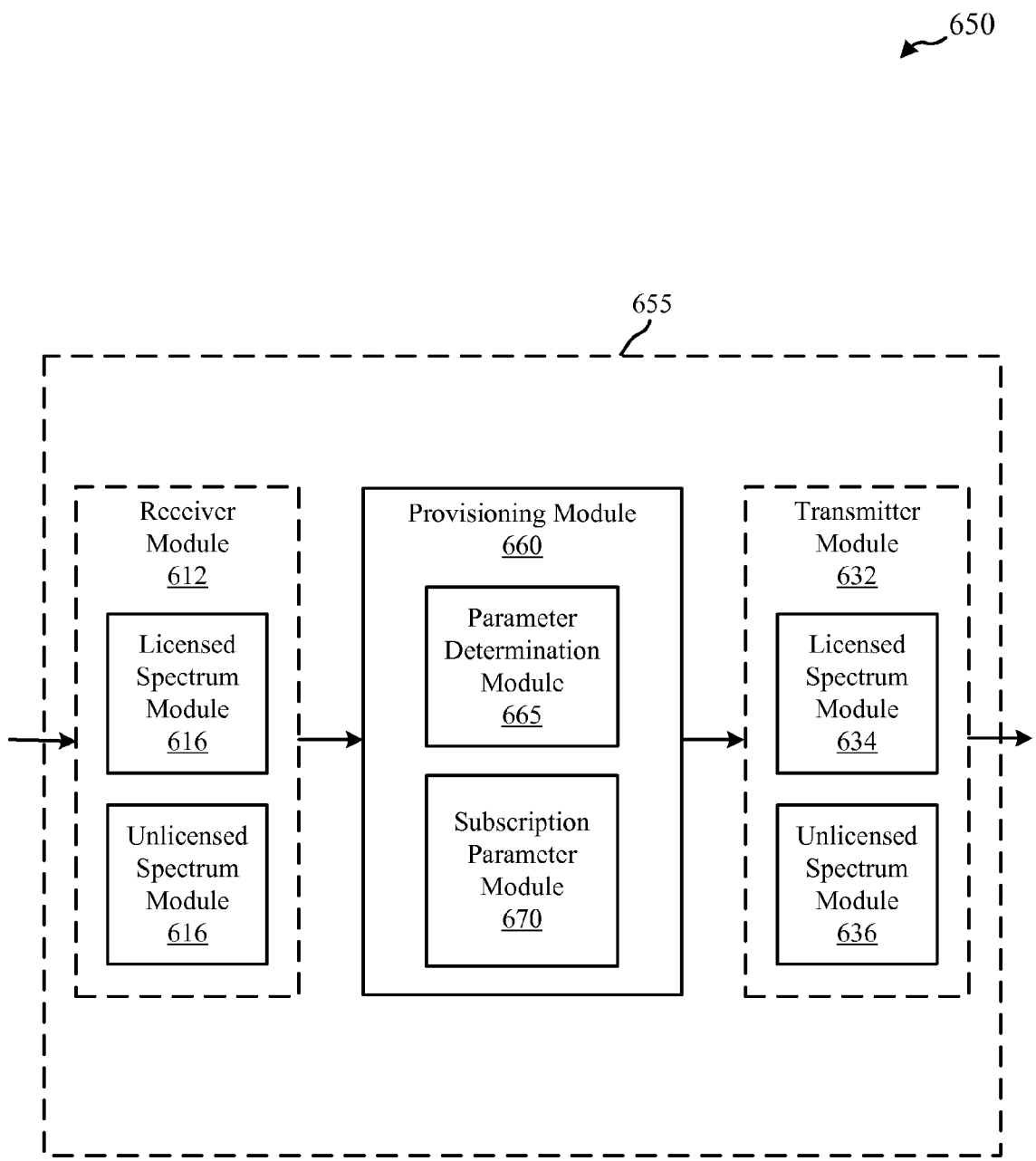

Referring now to FIG. 6B, a block diagram 650 illustrates a device 655 for use in wireless communications in accordance with various embodiments. In some embodiments, the device 655 may be an example of one or more aspects of the eNBs 105, 205, 305, 405, 505, UEs 115, 215, 315, 415, 515, and/or MME/HSS 220 and 232, 320, 420, or 520 described with reference to FIG. 1, 2, 3, 4, and/or 5. The device 655 may also be a processor. The device 655 may include a receiver module 612, a provisioning module 660, and/or a transmitter module 632. Each of these components may be in communication with each other.

The components of the device 655 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 612 may be an example of the receiver module 610 of FIG. 6A. The receiver module 612 may be or include a radio frequency (RF) receiver, such as an RF receiver operable to receive transmissions in a licensed spectrum and/or an unlicensed spectrum. The RF receiver may include separate receivers for the licensed spectrum and the unlicensed spectrum. The separate receivers may in some cases take the form of a licensed spectrum module 614 and an unlicensed spectrum module 616. The receiver module 612, including the licensed spectrum module 614 and the unlicensed spectrum module 616, may be used to receive various types of data and/or control signals (i.e., transmissions) over one or more communication links of a wireless communications system including the licensed and unlicensed spectrums, such as one or more communication links of the wireless communications system 100, 200, and/or 300 described with reference to FIG. 1, 2, and/or 3.

In some embodiments, the transmitter module 632 may be an example of the transmitter module 630 of FIG. 6A. The transmitter module 632 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 634 and an unlicensed spectrum module 636. The transmitter module 632 may be used to transmit various types of data and/or control signals (i.e., transmissions) over one or more communication links of a wireless communications system, such as one or more communication links of the wireless communications system 100, 200, and/or 300 described with reference to FIG. 1, 2, and/or 3.

The provisioning module 660 may be an example of the provisioning module 620 described with reference to FIG. 6A and may include a parameter determination module 665, and a subscription parameter module 670. Each of these components may be in communication with each other.

In some embodiments, the parameter determination module 665 may determine UE parameters that are reported to a network entity. Such UE parameters may include, for example, a device identity for a UE, as well as an LTE shared secret as well as a URL for a subscription server associated with the UE. Subscription parameter module 670 may determine one or more verification and/or subscription parameters that may be used to authenticate security credentials of a UE for providing network access. Such subscription parameters and/or verification parameters may be derived according to any of the techniques described above with respect to FIGS. 4-5.

Figure 7:
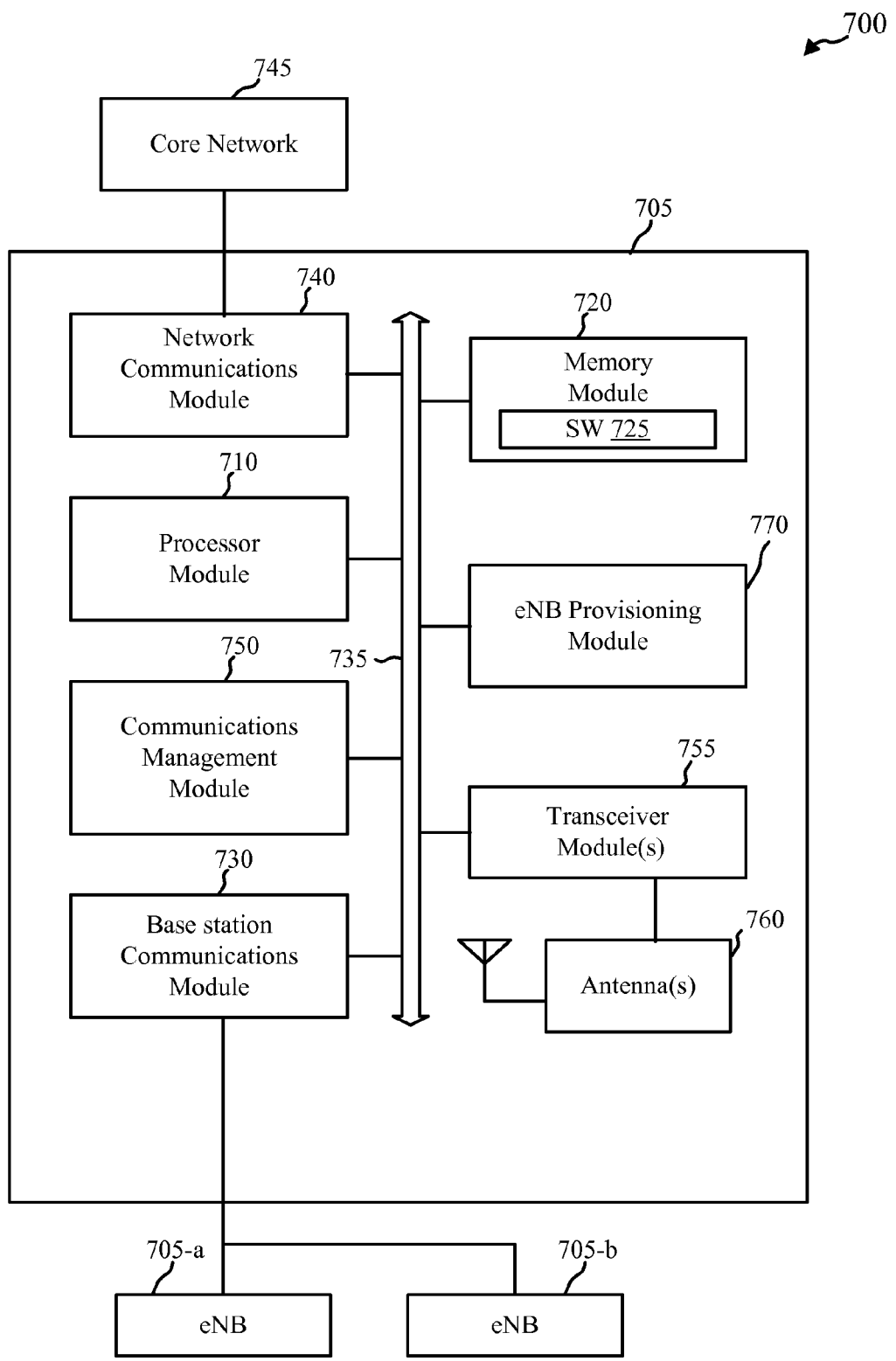
FIG. 7 shows a block diagram that illustrates an example of an eNB architecture according to various embodiments.

Turning to FIG. 7, a block diagram 700 is shown that illustrates an eNB 705 configured for provisioning a UE. In some embodiments, the eNB 705 may be an example of one or more aspects of the eNBs or devices 105, 205, 305, 405, 505, 605, and/or 655 described with reference to FIG. 1, 2, 3, 4, 5, 6A, and/or 6B. The eNB 705 may be configured to implement at least some of the provisioning features and functions described with respect to FIG. 1, 2, 3, 4, 5, 6A, and/or 6B. The eNB 705 may include a processor module 710, a memory module 720, at least one transceiver module (represented by transceiver module(s) 755), at least one antenna (represented by antenna(s) 760), and/or an eNB provisioning module 770. The eNB 705 may also include one or both of a base station communications module 730 and a network communications module 740. Each of these components may be in communication with each other, directly or indirectly, over one or more buses 735.

The memory module 720 may include random access memory (RAM) and/or read-only memory (ROM). The memory module 720 may store computer-readable, computer-executable software (SW) code 725 containing instructions that are configured to, when executed, cause the processor module 710 to perform various functions described herein for using LTE-based communications in a licensed and/or unlicensed spectrum, including the provisioning of one or more UEs for communication using eNB 705. Alternatively, the software code 725 may not be directly executable by the processor module 710 but be configured to cause the eNB 705, e.g., when compiled and executed, to perform various of the functions described herein.

The processor module 710 may include an intelligent hardware device, e.g., a central processing unit (CPU), a microcontroller, an ASIC, etc. The processor module 710 may process information received through the transceiver module(s) 755, the base station communications module 730, and/or the network communications module 740. The processor module 710 may also process information to be sent to the transceiver module(s) 755 for transmission through the antenna(s) 760, to the base station communications module 730 for transmission to one or more other base stations or eNBs 705-*a* and 705-*b*, and/or to the network communications module 740 for transmission to a core network 745, which may be an example of aspects of the core network 130 described with reference to FIG. 1. The processor module 710 may handle, alone or in connection with the eNB provisioning module 770, various aspects of using LTE-based communications, including the performance of provisioning features and techniques.

The transceiver module(s) 755 may include a modem configured to modulate the packets and provide the modulated packets to the antenna(s) 760 for transmission, and to demodulate packets received from the antenna(s) 760. The transceiver module(s) 755 may be implemented as one or more transmitter modules and one or more separate receiver modules. The transceiver module(s) 755 may support communications in at least one licensed spectrum and/or in at least one unlicensed spectrum. The transceiver module(s) 755 may be configured to communicate bi-directionally, via the antenna(s) 760, with one or more of the UEs or devices 115, 215, 315, 415, 515, 605 and/or 655 described with reference to FIGS. 1-6, for example. The eNB 705 may typically include multiple antennas 760 (e.g., an antenna array). The eNB 705 may communicate with the core network 745 through the network communications module 740. The eNB 705 may communicate with other base stations or eNBs, such as the eNBs 705-*a* and 705-*b*, using the base station communications module 730.

According to the architecture of FIG. 7, the eNB 705 may further include a communications management module 750. The communications management module 750 may manage communications with other base stations, eNBs, and/or devices. The communications management module 750 may be in communication with some or all of the other components of the eNB 705 via the bus or buses 735. Alternatively, functionality of the communications management module 750 may be implemented as a component of the transceiver module(s) 755, as a computer program product, and/or as one or more controller elements of the processor module 710.

The eNB provisioning module 770 may be configured to perform and/or control some or all of the eNB provisioning functions or aspects described with reference to FIG. 1, 2, 3, 4, 5, 6A, and/or 6B related to using LTE-based communications with a UE that may not be provisioned for network access through the eNB 705. The eNB provisioning module 770, or portions of it, may include a processor and/or some or all of the functionality of the eNB provisioning module 770 may be performed by the processor module 710 and/or in connection with the processor module 710.

Figure 8:
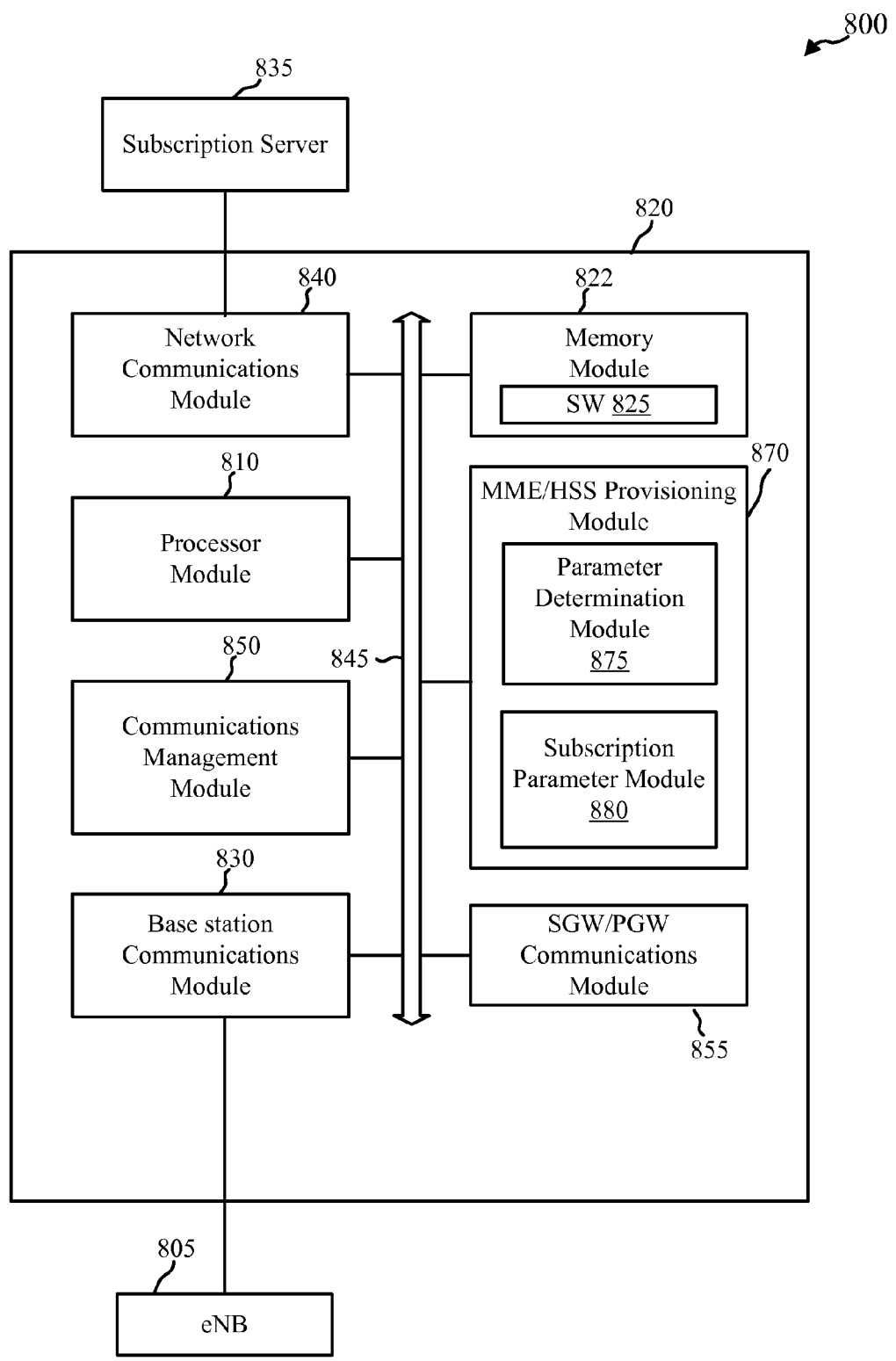
FIG. 8 shows a block diagram that illustrates an example of a network entity architecture according to various embodiments.

Turning to FIG. 8, a block diagram 800 is shown that illustrates a MME/HSS 820 according to various embodiments. The MME/HSS 820 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The MME/HSS 820 may be configured to communicate with one or more of the eNBs or devices 105, 205, 305, 405, 505, 605, 655, and/or 705 described with reference to FIGS. 1-7. The MME/HSS 820 also may be configured to communicate with one or more of the UEs or devices 115, 215, 315, 415, 515, 605, 655, and/or 715 described with reference to FIGS. 1-7.

The MME/HSS 820 may include a processor module 810, a memory module 822, a base station communications module 830, a SGW/PGW communication module 855, a network communications module 840, and/or a MME/HSS provisioning module 870. Each of these components may be in communication with each other, directly or indirectly, over one or more buses 845.

The memory module 822 may include RAM and/or ROM. The memory module 822 may store computer-readable, computer-executable software (SW) code 825 containing instructions that are configured to, when executed, cause the processor module 810 to perform various functions described herein for using LTE-based communications in a licensed and/or unlicensed spectrum. Alternatively, the software code 825 may not be directly executable by the processor module 812 but be configured to cause the MME/HSS 820 (e.g., when compiled and executed) to perform various of the MME/HSS functions described herein.

The processor module 810 may include an intelligent hardware device, e.g., a CPU, a microcontroller, an ASIC, etc. The processor module 810 may process information received through the network communications module 840, base station communications module 830, and/or SGW/PGW communication module 855. The processor module 810 may handle, alone or in connection with the MME/HSS provisioning module 870, various aspects of using LTE-based communications in a licensed and/or unlicensed spectrum including provisioning of UEs to an associated network.

According to the architecture of FIG. 8, the MME/HSS 820 may further include a communications management module 850. The communications management module 850 may manage communications with various base stations or eNBs, subscription server(s) 835, and/or SGW(s)/PGW(s). The communications management module 850 may be a component of the MME/HSS 820 in communication with some or all of the other components of the MME/HSS 820 over the one or more buses 845. Alternatively, functionality of the communications management module 850 may be implemented as a computer program product, and/or as one or more controller elements of the processor module 810.

The MME/HSS provisioning module 870 may be configured to perform and/or control some or all of the MME/HSS functions or aspects described in FIG. 1, 2, 3, 4, 5, 6A, 6B, and/or 7 related to provisioning of UEs with a network. For example, the MME/HSS provisioning module 870 may be configured to support reception of a UE identification and a subscription server URL, communication with the identified subscription, and exchange of verification and subscription parameters. The MME/HSS provisioning module 870 may be an example of devices 605 and/or 655 of FIGS. 6A and/or 6B. The MME/HSS provisioning module 870 may include a parameter determination module 875 and a subscription parameter module 880. The parameter determination module 875 may determine UE parameters that are reported to a network entity. Such UE parameters may include, for example, a device identity for a UE, as well as an LTE shared secret and a URL for a subscription server associated with the UE. Subscription parameter module 880 may determine one or more verification and/or subscription parameters that may be used to authenticate security credentials of a UE for providing network access. Such subscription parameters and/or verification parameters may be derived according to any of the techniques described above with respect to FIGS. 4-5. The MME/HSS provisioning module 870, or portions of it, may include a processor and/or some or all of the functionality of the MME/HSS provisioning module 870 may be performed by the processor module 810 and/or in connection with the processor module 810.

Figure 9:
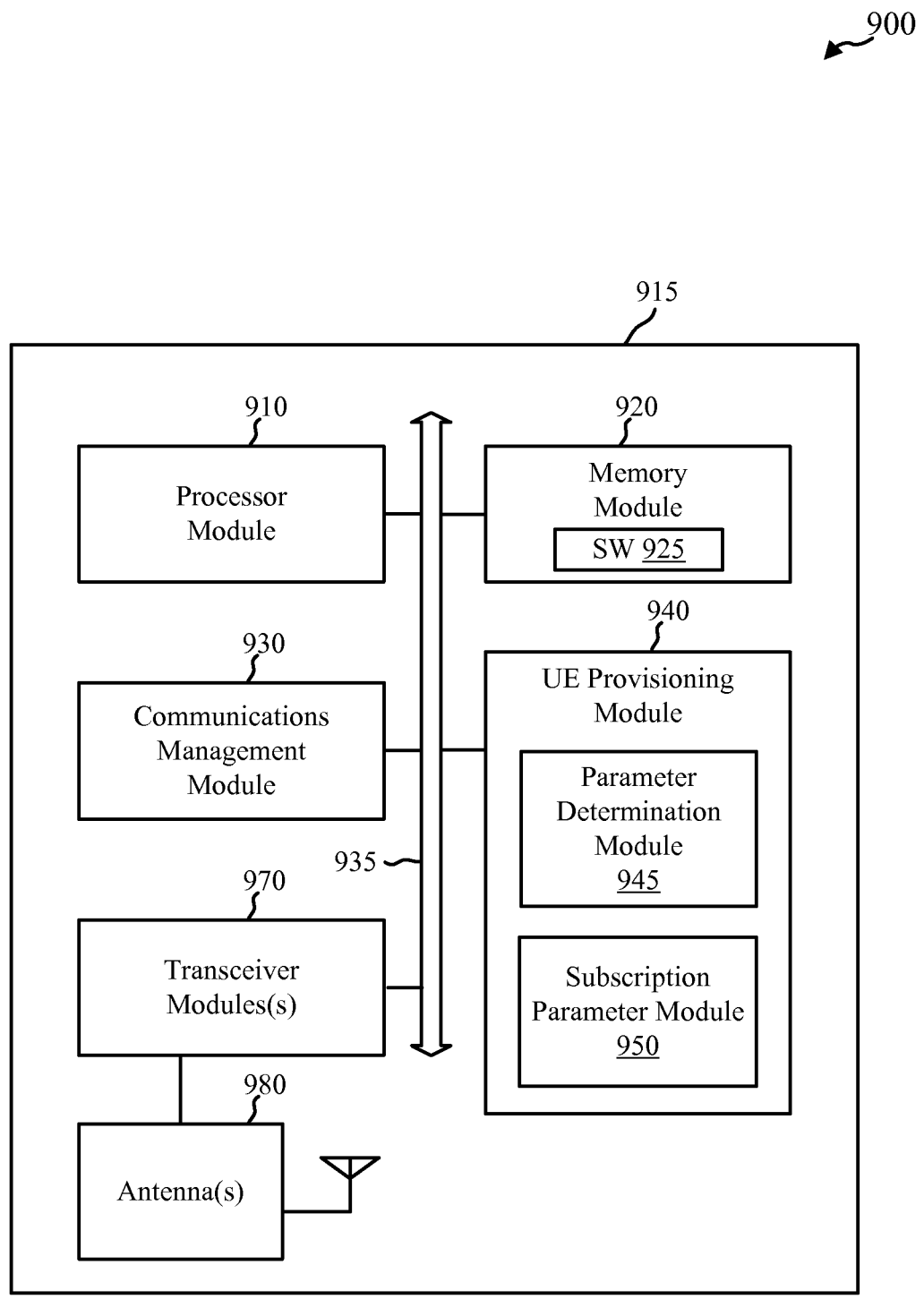
FIG. 9 shows a block diagram that illustrates an example of a UE architecture according to various embodiments.

Turning to FIG. 9, a block diagram 900 is shown that illustrates a UE 915 in accordance with various embodiments. The UE 915 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 915 may have an internal power supply (not shown), such as a small battery, to facilitate mobile operation. In some embodiments, the UE 915 may be an example of one or more of the UEs or devices 115, 215, 315, 415, 515, 605, 655, and/or 715 described with reference to FIGS. 1-7. The UE 915 may be configured to communicate with one or more of the eNBs or devices 105, 205, 305, 405, 505, 605, 655, 705, and/or 820 described with reference to FIGS. 1-8.

The UE 915 may include a processor module 910, a memory module 920, at least one transceiver module (represented by transceiver module(s) 970), at least one antenna (represented by antenna(s) 980), and/or a UE provisioning module 940. Each of these components may be in communication with each other, directly or indirectly, over one or more buses 935.

The memory module 920 may include RAM and/or ROM. The memory module 920 may store computer-readable, computer-executable software (SW) code 925 containing instructions that are configured to, when executed, cause the processor module 910 to perform various functions described herein for using LTE-based communications and provisioning UEs in an LTE network. Alternatively, the software code 925 may not be directly executable by the processor module 910 but be configured to cause the UE 915 (e.g., when compiled and executed) to perform various of the UE functions described herein.

The processor module 910 may include an intelligent hardware device, e.g., a CPU, a microcontroller, an ASIC, etc. The processor module 910 may process information received through the transceiver module(s) 970 and/or information to be sent to the transceiver module(s) 970 for transmission through the antenna(s) 980. The processor module 910 may handle, alone or in connection with the UE provisioning module 940, various aspects of using LTE-based communications and UE provisioning.

The transceiver module(s) 970 may be configured to communicate bi-directionally with eNBs. The transceiver module(s) 970 may be implemented as one or more transmitter modules and one or more separate receiver modules. The transceiver module(s) 970 may support communications in at least one licensed spectrum and in at least one unlicensed spectrum. The transceiver module(s) 970 may include a modem configured to modulate the packets and provide the modulated packets to the antenna(s) 980 for transmission, and to demodulate packets received from the antenna(s) 980. While the UE 915 may include a single antenna, there may be embodiments in which the UE 915 may include multiple antennas 980.

According to the architecture of FIG. 9, the UE 915 may further include a communications management module 930. The communications management module 930 may manage communications with various base stations or eNBs. The communications management module 930 may be a component of the UE 915 in communication with some or all of the other components of the UE 915 over the one or more buses 935. Alternatively, functionality of the communications management module 930 may be implemented as a component of the transceiver module(s) 970, as a computer program product, and/or as one or more controller elements of the processor module 910.

The UE provisioning module 940 may be configured to perform and/or control some or all of the UE provisioning functions or aspects described in FIG. 1, 2, 3, 4, and/or 5 related to using LTE-based communications and provisioning the UE 915 to provide LTE communications with an operator and/or non-operator network. For example, the UE provisioning module 940 may be configured to provide UE parameters to a network entity and receive security and subscription parameters for network access. The UE provisioning module 940 may include a parameter determination module 945 and a subscription parameter module 950. The parameter determination module 945 may determine UE 915 parameters that are to be reported to a network entity. Such UE 915 parameters may include, for example, a device identity for the UE 915, as well as an LTE shared secret and a URL for a subscription server associated with the UE 915. Subscription parameter module 950 may determine one or more verification and/or subscription parameters that may be used to authenticate security credentials of the UE 915 for providing network access. Such subscription parameters and/or verification parameters may be derived according to any of the techniques described above with respect to FIGS. 4-5. The UE provisioning module 940 may be an example of devices 605 and/or 655 of FIGS. 6A and/or 6B, and parameter determination module 945 and subscription parameter module 950 may be examples of modules 665 and 670 described with reference to FIG. 6B. The UE provisioning module 940, or portions of it, may include a processor and/or some or all of the functionality of the UE provisioning module 940 may be performed by the processor module 910 and/or in connection with the processor module 910.

Figure 10:
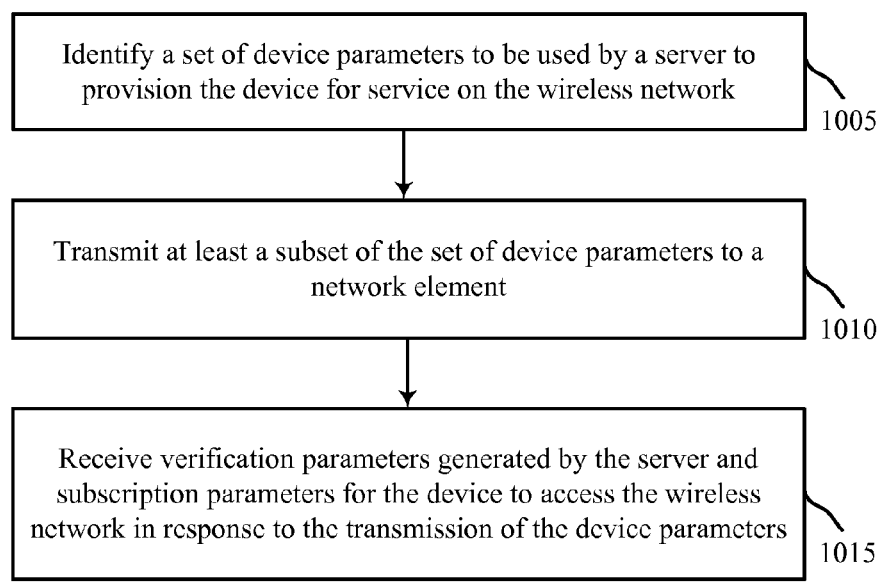
FIGS. 10 and 11 are flowcharts of examples of methods for provisioning of a UE according to various embodiments.

FIG. 10 is a flow chart illustrating an example of a method 1000 for wireless communications. For clarity, the method 1000 is described below with reference to ones of the UEs or devices 115, 215, 315, 415, 515, 605, 655, and/or 915 described with reference to FIG. 1, 2, 3, 4, 5, 6A, 6B, and/or 9. In one embodiment, a UE may execute one or more sets of codes to control the functional elements of the UE to perform the functions described below.

At block 1005, a set of device parameters to be used by a server to provision the device for service on the wireless network are identified. The set of device parameters may include, for example, one or more of an IMEI, a mobile equipment identifier (MEID), a medium access control (MAC) address, or an IMSI, for example. In some examples, the set of device parameters may include an identifier for the device and/or a server identifier, and may in some cases also include shared secret with the server that is identified by the server identifier. The server identifier may include a URL, a fully qualified domain name (FQDN), or an Internet protocol (IP) address for a server associated with the device, for example. The operation(s) at block 1005 may in some cases be performed using the provisioning modules 620 and/or 660 described with reference to FIG. 6A and/or 6B, and/or the UE provisioning module 940 described with reference to FIG. 9.

At block 1010, at least a subset of the set of device parameters are transmitted to a network element. Such transmitting may include, for example, transmitting the device parameters to the network element via a non-access stratum (NAS) message, such as an uplink (UL) generic NAS transport message, for example. The operation(s) at block 1010 may in some cases be performed using the provisioning modules 620 and/or 660 described with reference to FIG. 6A and/or 6B, the UE provisioning module 940, and/or transceiver module(s) 970 and antenna(s) 980 described with reference to FIG. 9.

At block 1015, verification parameters that are generated by the server and subscription parameters for the device to access the wireless network are received in response to the transmission of the device parameters. The subscription parameters, according to some embodiments, may be received in a downlink (DL) generic non-access stratum (NAS) transport message at the UE comprising the subscription parameters. In some examples, the subscription parameters may include one or more of a GUTI, IMSI, or token derived using a public key associated with the device. Such a token may be signed based on a deployment identifier of the non-provisioned network and one or more of the GUTI or IMSI assigned to the device, using a shared secret or a private key of a subscription server associated with the device. The deployment identifier, in some examples, may include one or more of a MCC/MNC, a CSG identification, a tracking area (TA), home nodeB (HNB) Name, an eNodeB identification, and/or a cell identification.

The operation(s) at block 1015 may in some cases be performed using the provisioning modules 620 and/or 660 described with reference to FIG. 6A and/or 6B, the UE provisioning module 940, and/or transceiver module(s) 970 and antenna(s) 980 described with reference to FIG. 9.

Thus, the method 1000 may provide for wireless communications in which UE provisioning may be performed, thereby providing network access to a UE that may not have associated operator security credentials. It should be noted that the method 1000 is just one implementation and that the operations of the method 1000 may be rearranged or otherwise modified such that other implementations are possible.

Figure 11:
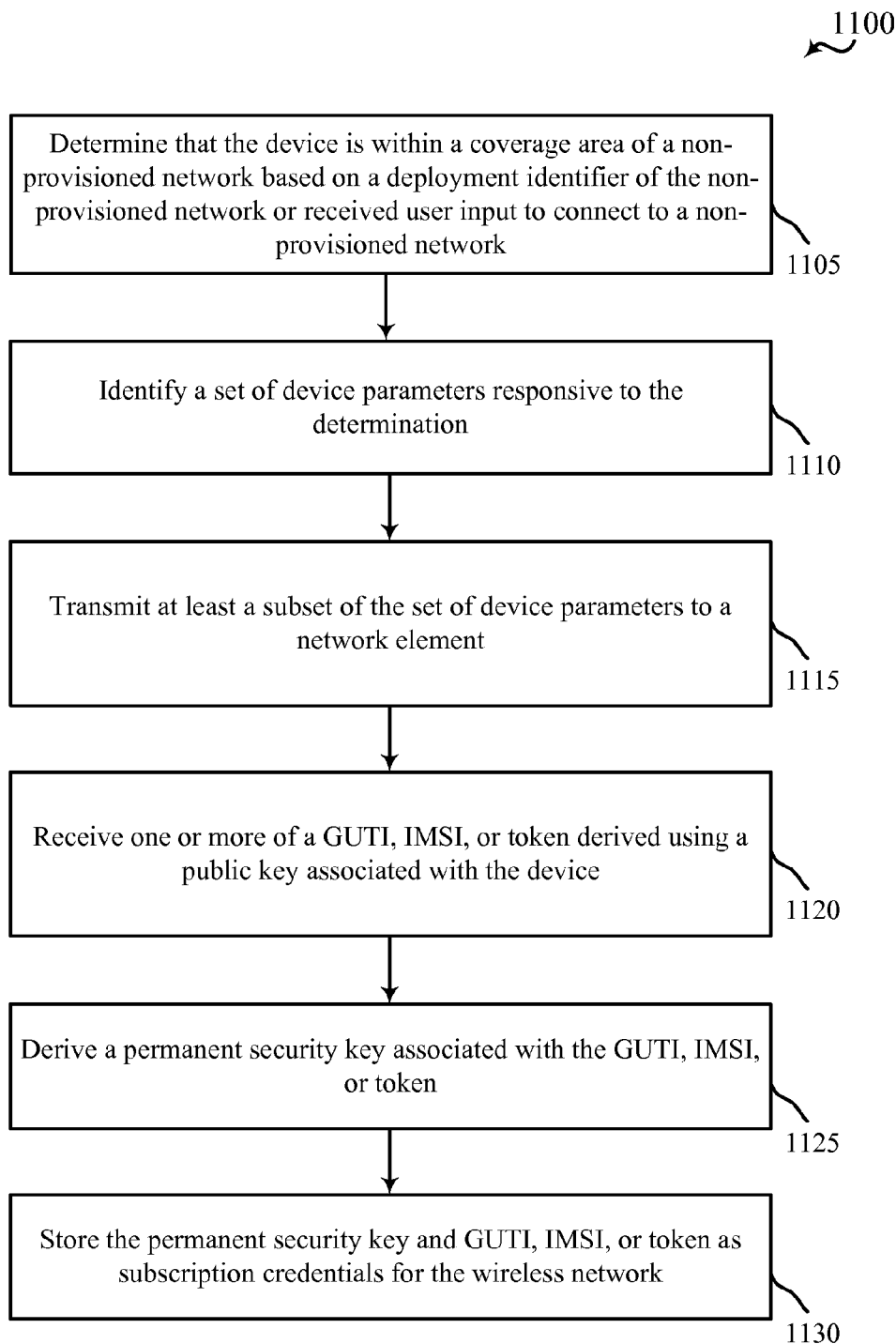

FIG. 11 is a flow chart illustrating an example of a method 1100 for wireless communications. For clarity, the method 1100 is described below with reference to ones of the UEs or devices 115, 215, 315, 415, 515, 605, 655, and/or 915 described with reference to FIG. 1, 2, 3, 4, 5, 6A, 6B, and/or 9. In one embodiment, a UE may execute one or more sets of codes to control the functional elements of the UE to perform the functions described below.

At block 1105, a determination is made that the device is within a coverage area of a non-provisioned network based on a deployment identifier of the non-provisioned network or received user input to connect to a non-provisioned network. The operation(s) at block 1105 may in some cases be performed using the provisioning modules 620 and/or 660 described with reference to FIG. 6A and/or 6B, the UE provisioning module 940, and/or transceiver module(s) 970 and antenna(s) 980 described with reference to FIG. 9.

At block 1110, a set of device parameters are identified responsive to the determination of block 1105. The set of device parameters may include, for example, one or more of an IMEI, a MEID, a MAC address, or an IMSI, for example. In some examples, the set of device parameters may include an identifier for the device and/or a server identifier, and may in some cases also include shared secret with the server that is identified by the server identifier. The server identifier may include a URL, a FQDN, or an IP address for a server associated with the device, for example. The operation(s) at block 1110 may in some cases be performed using the provisioning modules 620 and/or 660 described with reference to FIG. 6A and/or 6B, and/or the UE provisioning module 940 described with reference to FIG. 9.

At block 1115, the UE may transmit at least a subset of the set of device parameters to a network element. Such transmitting may include, for example, transmitting the device parameters to the network element via a NAS message, such as an UL generic NAS transport message, for example. The operation(s) at block 1115 may in some cases be performed using the provisioning modules 620 and/or 660 described with reference to FIG. 6A and/or 6B, the UE provisioning module 940, and/or transceiver module(s) 970 and antenna(s) 980 described with reference to FIG. 9.

At block 1120, the UE may receive one or more of a GUTI, IMSI, or token derived using a public key associated with the UE device. The operation(s) at block 1120 may in some cases be performed using the provisioning modules 620 and/or 660 described with reference to FIG. 6A and/or 6B, the UE provisioning module 940, and/or transceiver module(s) 970 and antenna(s) 980 described with reference to FIG. 9.

At block 1125, a permanent security key associated with the GUTI, IMSI, or token may be derived. The operation(s) at block 1125 may in some cases be performed using the provisioning modules 620 and/or 660 described with reference to FIG. 6A and/or 6B, and/or the UE provisioning module 940 described with reference to FIG. 9.

Finally, at block 1130, the permanent security key and GUTI, IMSI, or token are stored as subscription credentials for the wireless network. Such subscription credentials may be stored in a memory location along with an identification of the network, such that the UE, upon another connection with the network, may use the stored credentials and security parameters for network access without requiring the provisioning operations to be performed again. The operation(s) at block 1130 may in some cases be performed using the provisioning modules 620 and/or 660 described with reference to FIG. 6A and/or 6B, the UE provisioning module 940, the processor module 910, and/or the memory module 920 described with reference to FIG. 9.

Thus, the method 1100 may provide for wireless communications in which UE provisioning may be performed, thereby providing network access to a UE that may not have associated operator security credentials. It should be noted that the method 1100 is just one implementation and that the operations of the method 1100 may be rearranged or otherwise modified such that other implementations are possible.

Figure 12:
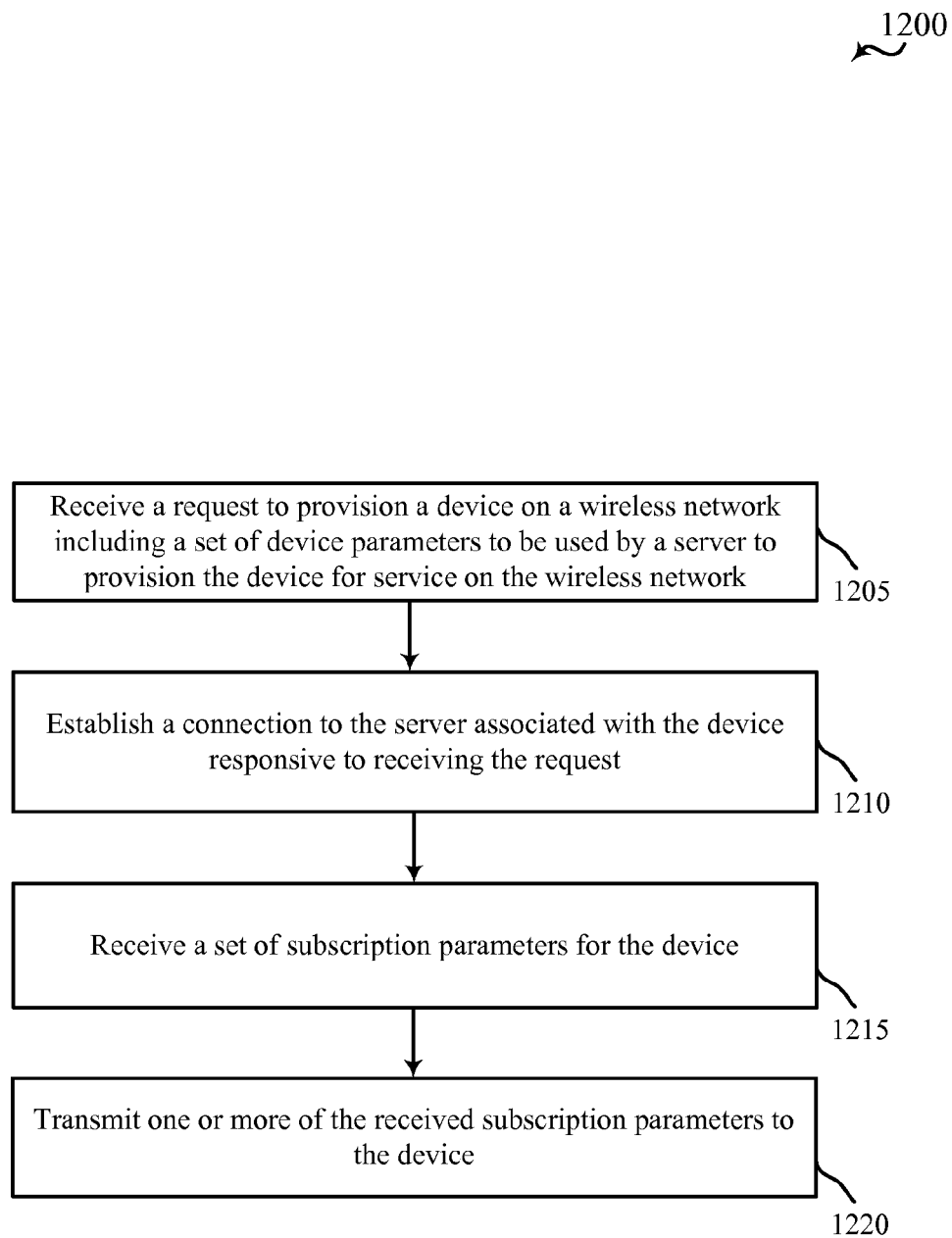
FIG. 12 is a flowchart of an example of a method for facilitating provisioning of a UE (e.g., at an eNB or other network entity) according to various embodiments.

FIG. 12 is a flow chart illustrating an example of a method 1200 for wireless communications. For clarity, the method 1200 is described below with reference to ones of the eNBs, MME/HSSs, or devices 105, 205, 232 and 220, 305, 320, 405, 420, 505, 520, 605, 655, 705, and/or 820 described with reference to FIG. 1, 2, 3, 4, 5, 6A, 6B, 7, and/or 8. In one embodiment, an eNB, MME/HSS, or device may execute one or more sets of codes to control the functional elements of the network element to perform the functions described below.

At block 1205, a request is received to provision a device on a wireless network, the request including a set of device parameters to be used by a server to provision the device for service on the wireless network. The set of device parameters may include, for example, an identifier for the device and/or a server identifier for a server to provision security credentials of the device. The server identifier may include one or more of a URL, a FQDN, and/or an IP address for a server associated with the device. In some examples, the request to provision may include the set of device parameters transmitted via a NAS message, such as an UL generic NAS transport message. In other examples, the set of device parameters may include one or more of an IMEI, a MEID, a MAC address, and/or an IMSI. Additionally or alternatively, the set of device parameters may include a shared secret.

The operation(s) at block 1205 may in some cases be performed using the provisioning module 620 and/or 660 described with reference to FIG. 6A and/or 6B, the eNB provisioning module 770, transceiver module 755, and/or antenna(s) 760 described with reference to FIG. 7, and/or the MME/HSS provisioning module 870 and/or base station communications module 830 described with reference to FIG. 8.

At block 1210, a connection is established with the server associated with the device responsive to receiving the request. Establishing such a connection may include, for example, establishing one or more of a transport layer security (TLS) or a hypertext transfer protocol secure (HTTPS) connection with the server. Establishing the connection may also include, in some examples, providing a deployment identifier associated with the wireless network. The operation(s) at block 1210 may in some cases be performed using the provisioning module 620 and/or 660 described with reference to FIG. 6A and/or 6B, the eNB provisioning module 770 and/or network communications module 740 described with reference to FIG. 7, and/or the MME/HSS provisioning module 870 and/or network communications module 840 described with reference to FIG. 8.

At block 1215, a set of subscription parameters is received for the device. The subscription parameters may include, for example, one or more of a GUTI, IMSI, or token derived using a public key, associated with the device. The operation(s) at block 1215 may in some cases be performed using the provisioning module 620 and/or 660 described with reference to FIG. 6A and/or 6B, the eNB provisioning module 770 and/or network communications module 740 described with reference to FIG. 7, and/or the MME/HSS provisioning module 870 and/or network communications module 840 described with reference to FIG. 8.

At block 1220, one or more of the received subscription parameters are transmitted to the device. Such transmitting may include, for example, transmitting a DL generic NAS transport message to the device that includes the subscription parameters. The operation(s) at block 1215 may in some cases be performed using the provisioning module 620 and/or 660 described with reference to FIG. 6A and/or 6B, the eNB provisioning module 770 and/or base station communications module 730 described with reference to FIG. 7, and/or the MME/HSS provisioning module 870 and/or base station communications module 830 described with reference to FIG. 8.

Thus, the method 1200 may provide for wireless communications in which a device may be provisioned through network-based provisioning. It should be noted that the method 1200 is just one implementation and that the operations of the method 1200 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for provisioning a device for service at a wireless network, the method comprising:
   identifying a set of device parameters to be used by a server to provision the device for service on the wireless network;
   transmitting at least a subset of the set of device parameters to a network element via a non-access stratum (NAS) message; and
   receiving one or more of a verification parameter or subscription parameter generated by the server for the device to access the wireless network in response to the transmission of the device parameters.

2. The method of claim 1, wherein the set of device parameters comprises one or more of an international mobile equipment identity (IMEI), a mobile equipment identifier (MEID), a medium access control (MAC) address, Network Access Identifier (NAI) or an international mobile subscriber identity (IMSI).

3. The method of claim 1, wherein the set of device parameters comprise an identifier for the device or a server identifier.

4. The method of claim 3, wherein the server identifier comprises one or more of a uniform resource locator (URL), a fully qualified domain name (FQDN), or an Internet protocol (IP) address for a server associated with the device.

5. The method of claim 1, wherein
   the NAS message comprises an uplink (UL) generic NAS transport message.

6. The method of claim 1, wherein the identifying comprises:
   determining that the device is within a coverage area of a network based on a deployment identifier of the network; and
   identifying the set of device parameters responsive to the determining.

7. The method of claim 6, wherein the network is a non-provisioned network.

8. The method of claim 1, wherein the identifying comprises:
   receiving a user input to connect to a network; and
   identifying the set of device parameters responsive to the receiving.

9. The method of claim 1, wherein the subscription parameter and/or verification parameter comprise one or more of a globally unique temporary identity (GUTI), international mobile subscriber identity (IMSI), or token derived using a shared secret or a public key associated with the device.

10. The method of claim 9, wherein the token is signed based on a deployment identifier of the non-provisioned network and one or more of the GUTI or IMSI assigned to the device, using a shared secret or a private key of a subscription server associated with the device.

11. The method of claim 10, wherein receiving the subscription parameter comprises:
    deriving a permanent security key associated with the subscription parameter; and
    storing the permanent security key and subscription parameter as subscription credentials for the wireless network.

12. An apparatus for wireless communications, comprising:
    a processor;
    memory coupled to the processor, the memory comprising instructions operable, when executed by the processor, to cause the apparatus to:
    identify a set of device parameters to be used by a server to provision the device for service on the wireless network;
    transmit at least a subset of the set of device parameters to a network element via a non-access stratum (NAS) message; and
    receive one or more of a verification parameter or subscription parameter generated by the server for the device to access the wireless network in response to the transmission of the device parameters.

13. The apparatus of claim 12, wherein the set of device parameters comprise an identifier for the device or a server identifier.

14. The apparatus of claim 12, wherein the instructions are operable to cause the apparatus to determine that the device is within a coverage area of a network based on a deployment identifier of the network, and identify the set of device parameters responsive to the determining.

15. The apparatus of claim 14, wherein the network is a non-provisioned network.

16. The apparatus of claim 12, wherein the subscription parameter comprises one or more of a globally unique temporary identity (GUTI), international mobile subscriber identity (IMSI), or token derived using a public key associated with the device.

17. The apparatus of claim 16, wherein the token is signed based on a deployment identifier of the non-provisioned network and one or more of the GUTI or IMSI assigned to the device, using a shared secret or a private key of a subscription server associated with the device.

18. A method for provisioning a device for service at a wireless network comprising:
    receiving a request via a non-access stratum (NAS) message to provision the device on the wireless network including a set of device parameters to be used by a server to provision the device for service on the wireless network;
    establishing a connection to the server associated with the device responsive to receiving the request;
    receiving a set of subscription parameters for the device; and
    transmitting one or more of the received subscription parameters to the device.

19. The method of claim 18, wherein establishing the connection comprises:
    providing a deployment identifier associated with the wireless network.

20. The method of claim 18, wherein the set of device parameters comprise an identifier for the device or a server identifier for a server to provision security credentials of the device.

21. The method of claim 20, wherein the set of device parameters comprises one or more of an international mobile equipment identity (IMEI), a mobile equipment identifier (MEID), a medium access control (MAC) address, Network Access Identifier (NAI) or an international mobile subscriber identity (IMSI).

22. The method of claim 18, wherein the subscription parameters comprise one or more of a globally unique temporary identity (GUTI), international mobile subscriber identity (IMSI), or token derived using a public key, associated with the device.

23. An apparatus for wireless communications, comprising:
   a processor;
   memory coupled to the processor, the memory comprising instructions operable, when executed by the processor, to cause the apparatus to:
   receive a request via a non-access stratum (NAS) message to provision the device on the wireless network including a set of device parameters to be used by a server to provision the device for service on the wireless network;
   establish a connection to the server associated with the device responsive to receiving the request;
   receive a set of subscription parameters for the device; and
   transmit one or more of the received subscription parameters to the device.

24. The apparatus of claim 23, wherein the instructions are operable to cause the apparatus to establish one or more of a transport layer security (TLS) or a hypertext transfer protocol secure (HTTPS) connection with the server.

25. The apparatus of claim 23, wherein the instructions are operable to cause the apparatus to provide a deployment identifier associated with the wireless network.

26. The apparatus of claim 23, wherein the set of device parameters comprise an identifier for the device or a server identifier for a server to provision security credentials of the device.

27. The apparatus of claim 26, wherein the set of device parameters comprises one or more of an international mobile equipment identity (IMEI), a mobile equipment identifier (MEID), a medium access control (MAC) address, Network Access Identifier (NAI) or an international mobile subscriber identity (IMSI).

28. The apparatus of claim 23, wherein the subscription parameters comprise one or more of a globally unique temporary identity (GUTI), international mobile subscriber identity (IMSI), or token derived using a public key, associated with the device.

* * * * *